United States Patent
Isaksson

(10) Patent No.: US 6,733,215 B2
(45) Date of Patent: May 11, 2004

(54) CUTTING INSERT FOR HEAVY TURNING OPERATIONS

(75) Inventor: Robert Isaksson, Järbo (SE)

(73) Assignee: Sandvik Aktiebolag, Sandiken (SE)

( * ) Notice: Subject to any disclaimer, the term of this patent is extended or adjusted under 35 U.S.C. 154(b) by 0 days.

(21) Appl. No.: 09/945,644

(22) Filed: Sep. 5, 2001

(65) Prior Publication Data

US 2002/0031410 A1 Mar. 14, 2002

(30) Foreign Application Priority Data

Sep. 5, 2000 (SE) .............................. 0003120

(51) Int. Cl.[7] .................. B23B 27/22; B23D 15/28
(52) U.S. Cl. ...................... 407/114; 407/115
(58) Field of Search .................. 407/113, 114, 407/115, 116

(56) References Cited

U.S. PATENT DOCUMENTS

| | | | | |
|---|---|---|---|---|
| 4,218,160 A | * | 8/1980 | Arnold | 407/114 |
| 4,844,668 A | * | 7/1989 | Pettersson | 407/117 |
| 4,913,604 A | * | 4/1990 | Zaengerle | 409/74 |
| 4,957,396 A | * | 9/1990 | Niebauer | 407/114 |
| 4,963,061 A | * | 10/1990 | Katbi et al. | 407/114 |
| 5,123,788 A | * | 6/1992 | Friederichs et al. | 407/114 |
| 5,442,981 A | * | 8/1995 | Vegh | 82/1.11 |
| 5,676,495 A | * | 10/1997 | Katbi et al. | 407/114 |
| 5,820,311 A | * | 10/1998 | Grun et al. | 407/102 |
| 5,827,017 A | * | 10/1998 | Tagstrom et al. | 407/116 |
| 6,017,172 A | * | 1/2000 | Ukegawa et al. | 407/113 |
| 6,238,147 B1 | * | 5/2001 | Tagtstrom et al. | 407/117 |
| 6,394,709 B1 | * | 5/2002 | Sjoo et al. | 407/2 |
| 2001/0014259 A1 | * | 8/2001 | Inayama | 407/116 |
| 2002/0122700 A1 | * | 9/2002 | Inayama | 407/117 |

* cited by examiner

*Primary Examiner*—A. L. Wellington
*Assistant Examiner*—Brian D. Walsh
(74) *Attorney, Agent, or Firm*—Burns, Doane, Swecker & Mathis, LLP

(57) ABSTRACT

A cutting insert intended for heavy turning operations has a top side, a bottom side, a front surface disposed between the top and bottom sides, and a cutting edge disposed in the area between the top side and the front surface. The cutting insert includes a comparatively thick front part having a chip breaker positioned behind the edge and a rear part, which is thinner than the front part and tapers rearwardly therefrom. Disposed in the top side of the rear part is a recess for receiving a clamping unit to fix the cutting insert in a co-operating sear of a holder.

14 Claims, 4 Drawing Sheets

CUTTING INSERT FOR HEAVY TURNING OPERATIONS

This application claims priority under 35 U.S.C. §§ 119 and/or 365 to patent application Ser. No. 0003120-3 filed in Sweden on Sep. 5, 2000, the entire content of which is hereby incorporated by reference.

TECHNICAL FIELD OF THE INVENTION

This invention relates to a cutting insert intended for heavy turning, which has a top side, a bottom side and a front surface interconnecting the top and bottom sides. A cutting edge is formed in the area between the top side and the front surface. The cutting edge is disposed on a comparatively thick front part of the insert, as is a chip breaker positioned behind the edge. A rear part of the insert is thinner than the front part.

PRIOR ART

In comparison with conventional turning, heavy turning is generally distinguished by the fact that in the main all parameters involved are considerably enlarged, e.g. greater cutting forces, larger chip thickness, larger and heavier workpieces, greater heat, etc. The feed during conventional turning usually is within the range of 0.05–0.8 mm/revolution, while the feed during heavy turning is within the range of 1–40 mm/revolution at the same time as the cutting depth may vary within the range of 0.2–6 mm. It is not unusual for the workpieces in question, e.g. rough shafts, to have a weight of one or more tons. Under these circumstances, it is necessary that not only the turning inserts, but also cassettes and carriers for the cutting inserts, have to be generously dimensioned.

Cutting inserts for heavy turning purposes are previously known in a plurality of different embodiments. A usual embodiment is characterized by a large thickness in relation to the depth or length of the cutting insert (i.e., the height of the front surface which extends between the cutting edge and the bottom side of the cutting insert is only slightly smaller than the length of the cutting insert, defined as the distance between the front surface and a rear end surface). Rearwards from the cutting edge, a portion of the top surface slopes obliquely downwards/rearwards, in which surface portion a straight chip breaking shoulder is formed. Said inclined surface portion ends in a delimitation surface oriented substantially parallel to the front surface. The delimitation surface at the bottom thereof transforms into a surface inclined rearwards/upwards on a short rear end portion if the insert in which a central, rearwardly porting opening is formed for a pin which has the purpose of fixing the cutting insert with the aim of counteracting lateral movements of the cutting insert. A clamping unit may be pressed against a surface inclined rearwards/upwards on the rear end portion of the cutting insert. By means of the clamping unit the cutting insert is kept clamped with the rear end surface thereof in contact with an abutment surface in the cassette (in which the cutting insert can be assembled), at the same time that the bottom side of the cutting insert is kept pressed against a bottom surface in the cassette.

However, a disadvantage of this known cutting insert for heavy turning is that in practice it is suitable for grooving operations, but not for longitudinal turning, inasmuch as the lateral stability of the cutting insert is mediocre. Thus, disturbances of the cutting insert longitudinally are only counteracted by the above-mentioned pin, which for technical, dimensioning reasons is comparatively weak.

Another disadvantage of the cutting insert is that it requires extensive and expensive grinding. Thus, the portion of the top surface sloping obliquely downwards from the cutting edge, as well as the front surface and the bottom side must be precision-ground in a plurality of steps.

An additional disadvantage is that the clamping unit for the cutting insert is exposed to considerable stresses caused by the arrival of hot chips since the top surface of the cutting insert slopes obliquely downwards/rearwards against the clamping unit. Furthermore, the known cutting insert has a limited ability to reduce the width of the chip after separation of the same from the workpiece by the cutting edge. This is something that makes it more difficult for the chip to release from the groove which is being cut.

AIMS AND FEATURES OF THE INVENTION

The present invention aims at obviating the above-mentioned inconveniences of the previously known cutting insert for heavy turning and at providing an improved cutting insert for heavy turning purposes. Therefore, a primary aim of the invention is to provide a cutting insert for heavy turning, which may be secured in a stable and reliable way, and thereby not only be used for plunge-cut operations, but also for longitudinal turning during which the cutting insert is exposed to considerable lateral forces. An additional aim is to create a cutting insert for heavy turning, which is suitable for manufacture by direct pressing, e.g. of cemented carbide powder, while minimizing the number of grinding operations. Yet another aim of the invention is to create a cutting insert for heavy turning having good chip breaking properties with the purpose of improving the protection of the clamping unit against the destructive effect of the hot chip and thereby increase the service life of the clamping unit. In a particular aspect, the invention also aims at providing a cutting insert for heavy turning which quickly and effectively reduces the width of the separated chip with the purpose of facilitating chip transport.

According to the invention, at least the primary aim is attained by a heavy-turning cutting insert comprising a top side and a bottom side. The insert defines front and rear parts. The front part terminates forwardly in a front surface situated between the top and bottom sides. A cutting edge is formed in an area between the front surface and the top side. The front part includes a chip breaker disposed in the top side behind the cutting edge. The rear part is thinner than the front part as measured in a direction from the top side to the bottom side. The rear part includes two side surfaces converging rearwardly at an acute angle. The rear part includes a recess formed in the top surface and adapted for receiving a clamp.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
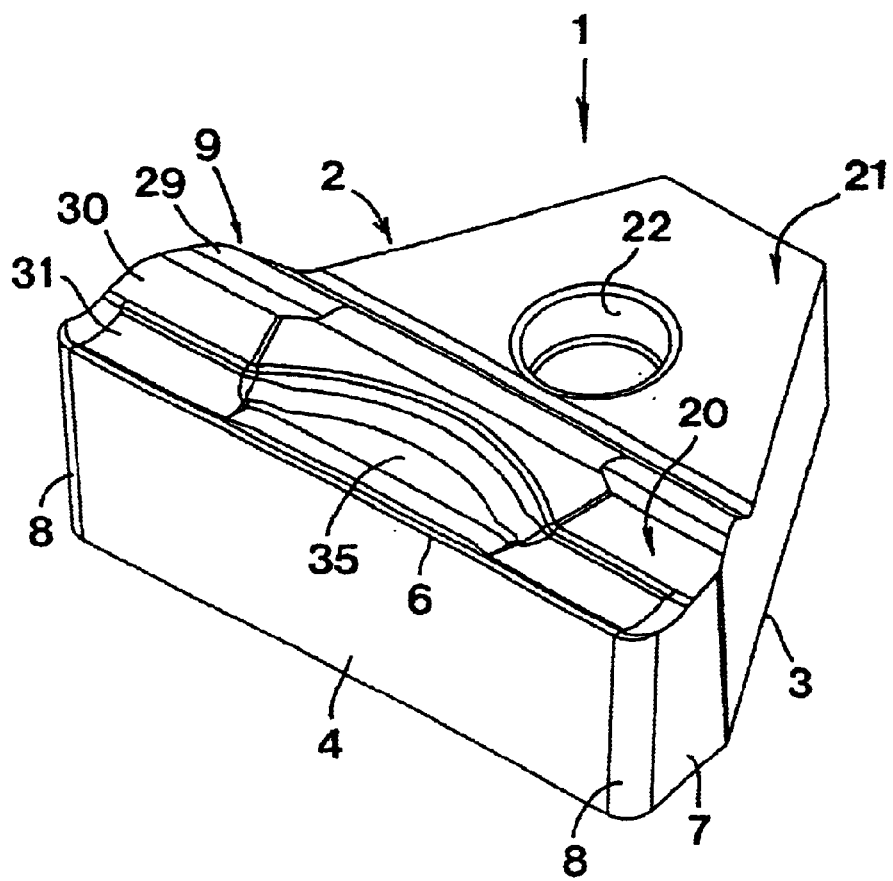
FIG. 1 is a perspective view of a cutting insert according to the invention as seen obliquely from above and from the front.
Figure 2:
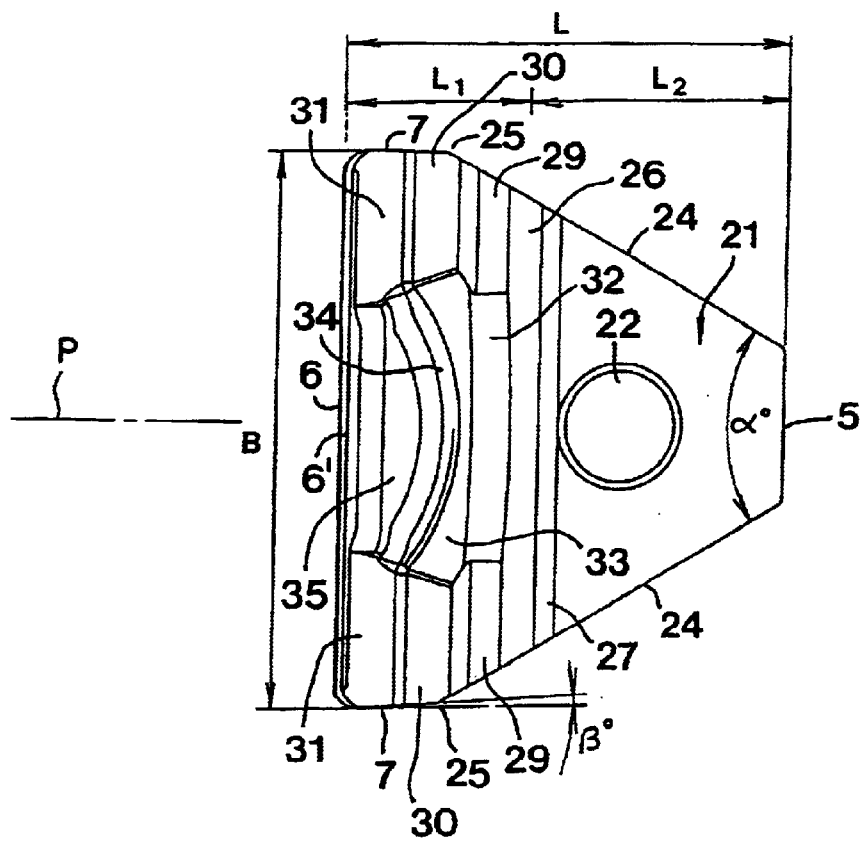
FIG. 2 is a planar view from above of the cutting insert according to FIG. 1.
Figure 3:
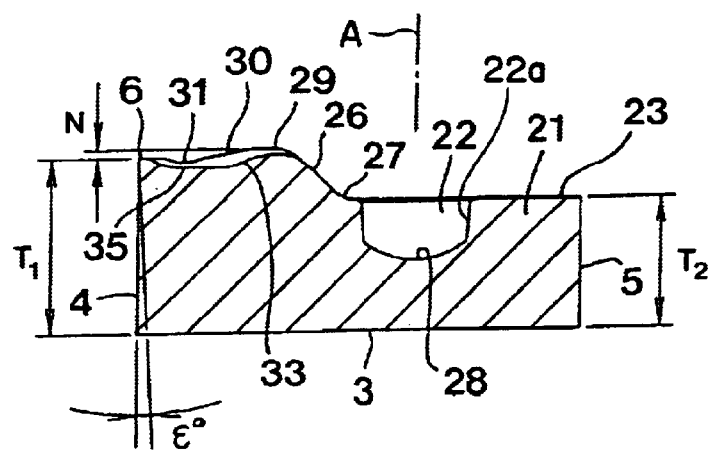
FIG. 3 is a longitudinal section through the same cutting insert.

In FIGS. 1–3, a first embodiment of a cutting insert 1 according to the invention is illustrated. The cutting insert is defined by a top side 2 and an opposite bottom side 3. Between the top side 2 and the bottom side 3, a front surface 4 extends which is situated opposite a rear end surface 5. In the area between the front surface and the top side 2, a cutting edge 6 is formed, which in a conventional way consists of a sharp edge between the front surface 4 and a plane reinforcement surface or land 6'. At opposite ends thereof, the front surface 4 transforms into two lateral flank surfaces 7, more precisely via rounded transition surfaces 8.

The width B of the cutting insert is defined by the distance between said lateral flank surfaces 7, while the depth or length L of the cutting insert is defined as the distance between the front surface 4 and the rear end surface 5. In the area behind the cutting edge 6, a chip breaker 9 is formed in the topside of the cutting insert.

In practice, the cutting insert according to the invention may be made by the direct pressing of cemented carbide powder, the only requisite grinding consisting of face grinding of the bottom side 3.

Figure 4:
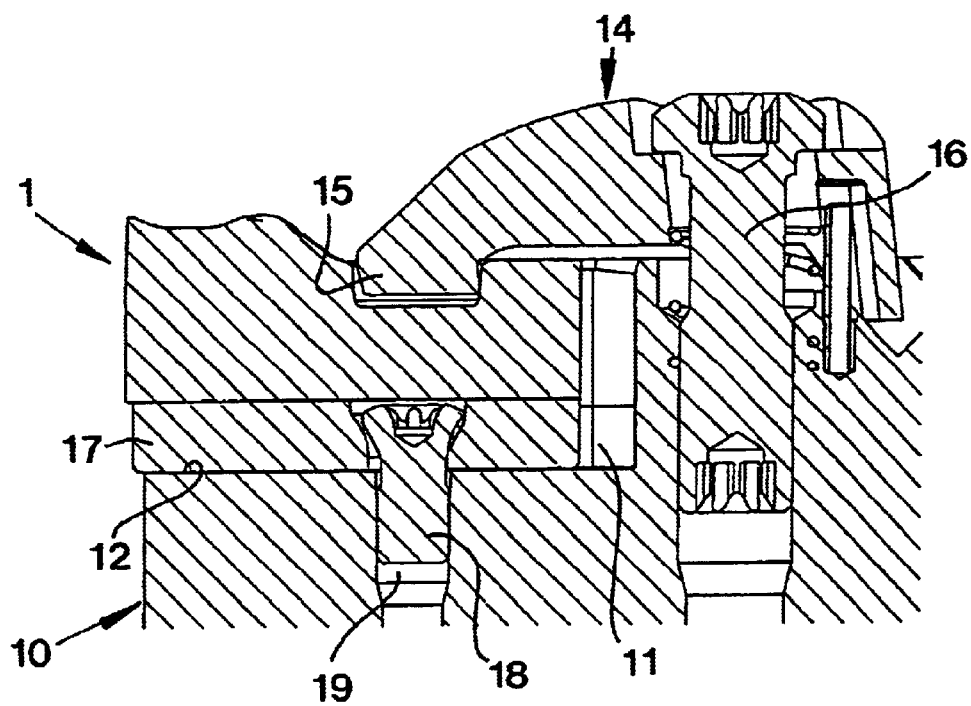
FIG. 4 is a section showing the cutting insert mounted in a cassette by means of a clamp.
Figure 5:
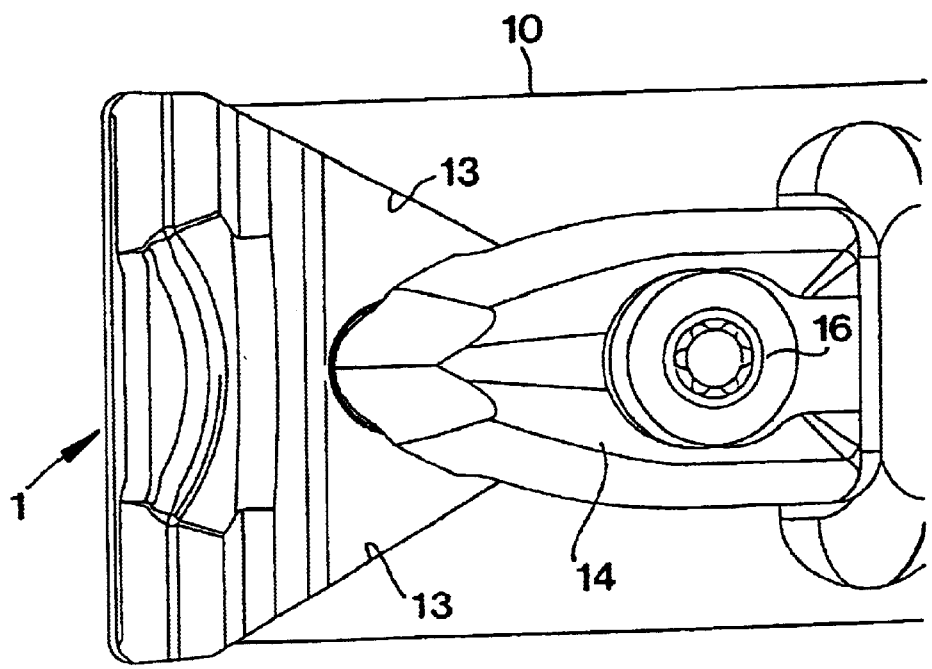
FIG. 5 is a planar view from above of the cutting insert, the cassette and the clamp according to FIG. 4.

Before the features of the cutting insert characteristic for the invention are described in more detail, reference is made to FIGS. 4 and 5, which illustrate the cutting insert 1 mounted in a cassette or holder 10, which in turn is, in a suitable way, detachably connected to a larger carrier such as a robust plate (not shown). In the cassette, a seat 11 intended for receipt of the cutting insert 1 is formed, which is delimited by a plane bottom surface 12, as well as two inclined side surfaces 13.

The cutting insert can be secured in said seat by means of a clamp 14, which at a front end has a nose 15. The clamp 14 is tightenable by means of a screw 16 at the rear end of the clamp. In the usual way, the geometry of the clamp and the screw is such that the nose 15, upon the tightening of the screw, moves rearwards/downwards in relation to the seat. A shim 17 is advantageously arranged between the cutting insert I and the bottom surface 12 of the seat 11, which shim, like the cutting insert, consists of cemented carbide. The shim 17 is kept in place by means of a countersunk screw 18, which is fastened in a threaded hole 19 porting in the bottom surface 12.

Now reference is made again to FIGS. 1–3.

Characteristic for the cutting insert according to the invention is that the insert comprises, in addition to a comparatively thick front part 20, on which the chip breaker 9 is formed, a rear part 21, which is thinner than the front part 20 and tapers in the rearwards direction therefrom. A recess 22 for the nose 15 of the clamp 14 is formed in the rear part 21 and intersects the top surface 23 thereof. A wall portion 22a of the recess faces toward the front part for engaging the nose 15. The recess is not cylindrical (i.e., is not of constant diameter), but rather widens conically upwardly. The recess 22 is symmetrical about a center axis A thereof (see FIG. 3).

In the example, the tapering shape of the rear part 21 is determined by two plane side surfaces 24, which converge toward the rear surface 5 at an acute angle α°. In the example shown, the nose angle α° amounts to 60°, although variations upwards as well as downwards from this angular value are feasible. However, the angle α° should be within the range of 30–80 °, preferably 45–70°. The cutting edge 6 extends perpendicularly to a center plane P that bisects the front and rear parts 20, 21 midway between the side surfaces 24 as the insert is viewed in top plan (FIG. 2). The cutting edge 6 extends linearly from one side of the front surface to an opposite side thereof.

At the respective rear ends thereof, the side surfaces 24 transform into the rear end surface 5, which in the example consists of a plane surface, which is parallel to the edge 6 and extends perpendicularly to the bottom side 3. At the respective front ends thereof, the side surfaces 24 transform into the aforementioned lateral flank surfaces 7, more precisely via corner edges 25. The thick front part 20 transforms into the thinner rear part 21 via a surface 26 sloping rearwards/downwards, a softly rounded surface portion 27 being formed between the sloping surface 26 and the plane top side 23 of the rear part. The length L, of the front part 20, defined as the distance from the edge 6 to the sloping surface 26, is in the example somewhat smaller than the length $L_2$ of the rear part 21 defined as the distance between the rear end of the surface 26 and the end surface 5. As may be clearly seen in FIG. 2, the corner edges 25 are situated in an area in front of the surface 26. In other words, also the rear portion of the front part 20 tapers in the same way as the rear part 21.

The thickness $T_1$ of the front part 20, defined as the distance between the cutting edge 6 and the bottom side 3 of the cutting insert, is considerably larger than the thickness $T_2$ of the rear part 21. In practice, the thickness $T_1$ should be 20–40% larger than the thickness $T_2$.

The recess 22 for the clamp nose 15 only opens upwards by ending in a bottom 28 situated at an elevation above the bottom side 3 of the cutting insert. In this way, a considerable quantity of material is retained in the area below the recess. This is something that vouches for maximal strength and minimal susceptibility to breakage of the cutting insert. Although it is feasible to form the recess with a depth that is no more than 70% of the thickness $T_2$, a depth not exceeding 50% of the thickness $T_2$ is preferred. In other respects, it should be noted that the recess 22 is located at a large distance from the rear end surface 5 of the cutting insert. More precisely, the recess is located in the immediate vicinity of the rounded surface 27 which constitutes a rear portion of the sloping transition surface 26. The recess 22, which advantageously is symmetrical about its center axis, and which may widen upwards by having a certain conicity, is centered between the two inclined rearwardly converging side surfaces 24. It should also be mentioned that the top surface 23 of the rear part 21 advantageously—though not necessarily—is planar.

In the embodiment exemplified in the drawings, which constitutes a prototype embodiment, the cutting insert has a width B of 40 mm and a length L of 31.5 mm, the length $L_1$ of the front part amounting to about 12.5 mm, i.e. approximately 40% of the total length L. Furthermore, the thickness $T_1$ of the front part amounts to 12.7 mm, while the rear part 21 has a thickness $T_2$ of 9.5 mm. Thus, although the front part is shorter in length and thicker than the rear part 21, the front part still has a considerable length $L_1$, (in practice 10 to 15 mm). This means that the insert designer is given a large degree of freedom to form the cutting insert with efficient chip breaking geometries for many different purposes.

In the illustrated, preferred embodiment, the chip breaker 9 is formed with a highest ridge 29, which is maximally distanced from the cutting edge 6, more precisely by being formed in the immediate proximity to the sloping transition surface 26. The level (height) difference N between this ridge 29 and the front edge 6 may vary most considerably, depending on other dimensions of the cutting insert (which in turn are dependent on the area of application of the cutting insert), but should be within the range of 0.3–3.0 mm. Forwards from the ridge 29, a sliding surface 30 slopes forwards/downwards, which at its front transforms into a flute 31 located immediately behind the cutting edge 6. The flute 31 is concavely curved and upwardly open. Each chip released from a workpiece by the cutting edge 6 passes across the arched flute 31 and then across the sloping sliding surface 30 in order to finally leave the cutting insert in the area of the ridge 29 which defines the highest point of the front portion.

In the illustrated, preferred embodiment a central countersink 32 is formed in the ridge 29, said countersink having a concavely arched basic shape, which in turn, in the forward direction, transforms into arched transition surfaces 33, 34, the rearmost one of which slopes forwards/downwards at a comparatively flat angle, while the other surface 34 slopes forwards/downwards at a steeper angle and transforms into a plane surface 35. The surface 35 constitutes a central interruption in the flute 31 and is countersunk in relation to the bottom of the flute 31. Thanks to the fact that these centrally situated surfaces 32, 33, 34 and 35 (i.e., centrally with respect to the width B) form centrally located interruptions in the ridge 29 and the surfaces 30 and 31, respectively, the centrally situated portion of the chip will tend to move at a higher speed than the two portions of the chip situated closest to the edges the chip. This means that the chip will be given a curved shape in cross section. In this way, the width of the chip becomes reduced from the nominal width determined by the width B of the cutting insert, whereby the release of the chip from a groove cut by the cutting insert is facilitated to a higher degree. In this connection, it should be noted that the edge 6 in the embodiment according to FIGS. 1–3 is straight (linear), i.e., it extends unbroken between opposite ends.

The two opposite side surfaces 7 of the cutting insert have clearance not only in the rearwards direction, as is indicated by a first clearance angle $\beta°$ in FIG. 2, but also in the downwards direction towards the bottom side of the cutting insert. Thus, the side surfaces 7 converge toward one another in the downward direction, and each forms a second clearance angle. Although said first and second clearance angles may vary depending on the field of use of the cutting insert, the same should amount to at least about 3°.

In the specific embodiment according to FIGS. 1–3, the cutting insert is formed with a neutral cutting geometry inasmuch as the front surface 4 extends perpendicularly to the bottom side 3. Alternatively, the front surface 4 could be inclined at an angle $\epsilon$ whereby they would possess at least a slightly positive cutting geometry.

Concerning the bottom side 3 of the cutting insert, it should be pointed out that this advantageously may be in the form of a face-ground surface, which forms a reference plane for the cutting insert in other respects. However, instead of the entire bottom side 3 being planar, it is also possible that the bottom side comprise either three triangularly located support faces or a triangular, frame-like and face-ground surface, which surrounds a central recess. What is important however is that the bottom side of the cutting insert may be pressed in close contact against a plane support surface, such as the topside of the shim 17 according to FIG. 4.

Figure 6:
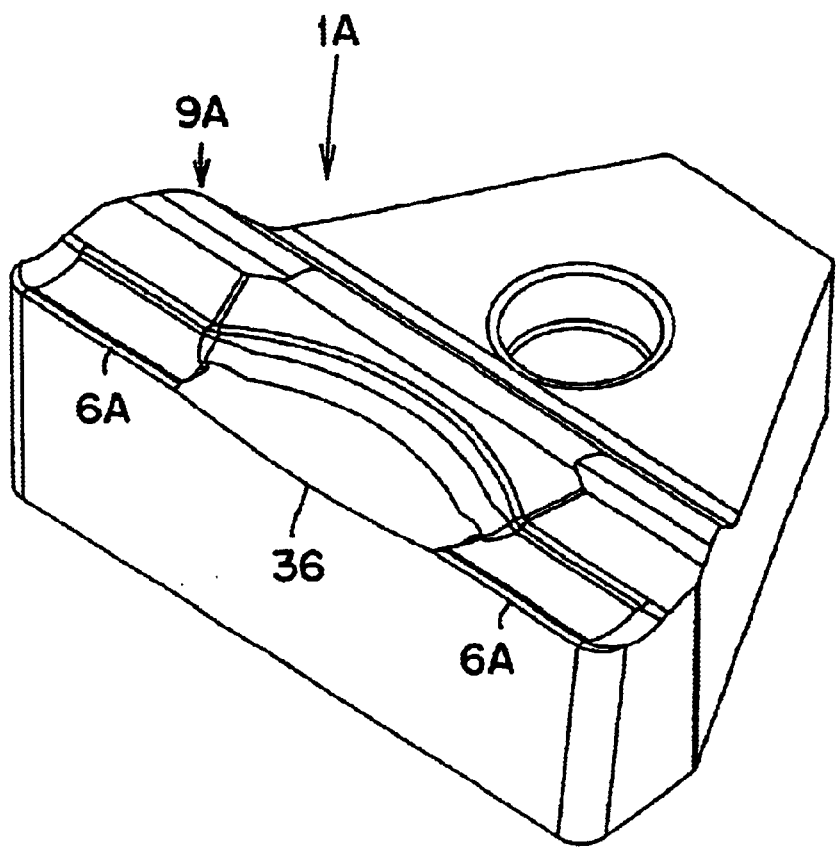
FIG. 6 is a perspective view illustrating an alternative embodiment of the cutting insert according to the invention.

In FIG. 6, an alternative embodiment of a cutting insert 1A according to the invention is shown. In this embodiment, not only the actual chip breaker 9A, but also the cutting edge 6A, is interrupted by a central countersink 36 having an arched basic shape. The countersink 36 is arch-shaped and extends between two linear sections of the cutting edge that extend from respective sides of the front surface. In this way, the cross-section-wise bending of the chip is initiated already by the arched portion 36 of the cutting edge. This is something that additionally renders the reduction of the width of the chip more efficient. The cutting edge 6A, 36 extends perpendicularly to a center plane that bisects the front and rear parts as the insert is viewed in top plan.

Advantages of the Cutting Insert According to the Invention

A substantial advantage of the cutting insert for heavy turning according to the invention is that the rather long rear part of the cutting insert resulting from the tapered shape thereof may be secured in a distinct and reliable way in an appurtenant seat having the same shape. Thanks to the fact that the clamp, upon tightening of the appurtenant screw, pulls the cutting insert in the rearwards direction, the inclined side surfaces of the cutting insert will thus be pressed against and wedged up between the wedge-shaped inclined side surfaces of the seat with a powerful force at the same time as the bottom side of the cutting insert is kept pressed in close contact against the bottom surface of the seat or against a shim when one is used.

Furthermore, thanks to the fact that the rear part of the cutting insert is considerably thinner than the thicker front part which carries the chip breaker, the clamp will be located in a comparatively protected position behind and below the chip breaker because the chip is encouraged by the chip breaker to distance itself from the clamp. Thanks to the stable and reliable fixation of the cutting insert in the appurtenant seat, the cutting insert will be versatile, i.e., usable not only for grooving operations but also for longitudinal turning in that the cutting insert can withstand large lateral forces.

Furthermore, in the described, preferred embodiments, the cutting insert offers the advantage that the width of the chip can be reduced quickly and effectively, whereby the removal of chips from deep grooves is also facilitated to a large extent.

The fact that the cutting insert may be secured by means of a clamp nose engaging in a comparatively shallow recess, allows the manufacture of a cutting insert with great strength and long service life in comparison with cutting inserts formed with through holes or openings, because a robust material portion can be retained in the area below the recess. Furthermore, by forming the recess so that it widens conically upwards at the same time as all surfaces in the chip breaker are exposed upwards, the cutting insert may be advantageously manufactured by the direct pressing of cemented carbide powder. Therefore, the only grinding operation that is required is a simple face grinding of the bottom surface of the cutting insert.

Feasible Modifications of the Invention

The invention is not solely restricted to the embodiments described above and exemplified in the drawings. Thus, it is possible to vary the chip breaking geometry within rather wide limits. Furthermore, the tapering shape of the rear part of the cutting insert may be determined in a way other than by means of two plane, inclined side surfaces 24, although plane surfaces are preferred in practice. Also, the shape of the recess 22 for the clamp nose porting in the topside of the rear part of the cutting insert may deviate from the illustrated, rotationally symmetrical shape. Nor does the rear part of the cutting insert need to be terminated by a plane surface. Thus, the rear end of the cutting insert may be delimited by, for instance, a curved surface.

What is claimed is:

1. A heavy-turning cutting insert comprising a top side and a bottom side, the insert defining front and rear parts,
    the front part terminating forwardly in a front surface situated between the top and bottom sides, a cutting edge formed in an area between the front surface and the top side, the front part including a chip breaker disposed in the top side behind the cutting edge,
    the rear part being thinner than the front part as measured in a direction from the top side to the bottom side,
    the rear part including two side surfaces converging rearwardly at an acute angle,
    the rear part including a recess formed in the top surface, the recess including a wall portion facing toward the front part and adapted for engaging a clamp, the cutting edge extending substantially perpendicularly to a center plane bisecting the front and rear sections midway between the side surfaces as viewed in a direction perpendicularly toward the top side,
    the chip breaker comprising a ridge disposed on the top side and spaced rearwardly from the cutting edge, the ridge extending to a height that is higher than the cutting edge, the height being measured perpendicularly to the bottom side, the top side further including a transition surface situated between the front and rear parts, the transition surface sloping rearwardly and downwardly from the ridge, a countersink formed in a central region of the ridge.

2. The heavy-turning insert according to claim 1 wherein the recess has a depth which is less than 70% of the thickness of the rear part.

3. The heavy-turning insert according to claim 2 wherein the recess is symmetrical about center axis thereof.

4. The heavy-turning insert according to claim 1 wherein the recess has a depth which is about 50% of the thickness of the rear part.

5. The heavy-turning insert according to claim 1 wherein the acute angle formed between the side surfaces is in the range of 30–80°.

6. The heavy-turning insert according to claim 5 wherein the acute angle is in the range of 45–70°.

7. The heavy-turning insert according to claim 5 wherein the acute angle is about 60°.

8. The heavy-turning insert according to claim 1 wherein the rear part terminates at a rear end of the insert, a length of the front part measured in a direction extending from the front surface toward the rear end being shorter than a length of the rear part, wherein the front and rear parts meet at a transition surface.

9. The heavy-turning insert according to claim 1 wherein the recess is formed closer to the transition surface than to the rear end.

10. The heavy-turning insert according to claim 1 wherein the ridge extends substantially parallel to the cutting edge as the insert as viewed in a direction parallel to the cutting edge.

11. The heavy-turning insert according to claim 1 wherein the top side further includes a slide surface sloping obliquely forwardly and downwardly from the countersink toward the cutting edge.

12. The heavy-turning insert according to claim 1 wherein the cutting edge includes a countersink formed in a central region thereof.

13. The heavy-turning insert according to claim 1 wherein the cutting edge extends linearly from one side of the front part to an opposite side thereof.

14. The heavy-turning insert according to claim 1 wherein the recess widens conically upwardly toward the top surface.

* * * * *